United States Patent [19]

Gross

[11] Patent Number: 4,883,303

[45] Date of Patent: Nov. 28, 1989

[54] DEFLECTOR SCREEN FOR MOTOR VEHICLE

[75] Inventor: Edward J. Gross, Ile de Chenes, Canada

[73] Assignee: Sundawn Inc., Winnipeg, Canada

[21] Appl. No.: 62,835

[22] Filed: Jun. 16, 1987

[51] Int. Cl.⁴ .............................................. B60J 1/20
[52] U.S. Cl. ..................................... 296/91; 248/300; 248/544; 248/558; 248/909; 403/331; 403/403
[58] Field of Search ............................ 296/91, 1 S, 93; 180/68.1; 224/309, 316, 329; 280/502; 160/DIG. 1; 293/128; 248/300, 544, 558, DIG.9, 223, 4, 224.1, 224.2; 403/331, 403, 205

[56] References Cited

U.S. PATENT DOCUMENTS

| | | | |
|---|---|---|---|
| 1,927,801 | 9/1933 | Maus | 152/325 |
| 2,448,456 | 8/1948 | Niskanen et al. | 248/544 X |
| 3,536,287 | 10/1970 | Kramer | 248/DIG. 9 |
| 4,052,099 | 10/1977 | Lowery et al. | 296/91 |
| 4,159,845 | 7/1979 | Bratsberg | 296/91 X |
| 4,364,596 | 12/1982 | Geisendorfer | 296/91 |
| 4,405,175 | 9/1983 | Hoffmann | 296/93 X |
| 4,471,991 | 9/1984 | Matthias | |
| 4,518,191 | 5/1985 | Williams et al. | |
| 4,544,300 | 10/1985 | Lew et al. | 403/331 X |
| 4,547,013 | 10/1985 | McDaniel | 296/91 X |
| 4,568,119 | 2/1986 | Minami et al. | 296/93 |
| 4,621,860 | 11/1986 | Gerst | 296/91 |
| 4,627,657 | 12/1986 | Daniels et al. | 296/91 |

FOREIGN PATENT DOCUMENTS 2103752 2/1983 United Kingdom .............. 403/331

Primary Examiner—Robert B. Reeves
Assistant Examiner—Russell D. Stormer
Attorney, Agent, or Firm—Adrian D. Battison; Stanley G. Ade

[57] ABSTRACT

A deflector screen for mounting at the front of a vehicle includes an extruded mounting strip having a pair of flanges defining a vertical channel along the length of the strip for receiving a substantially rigid plastic screen. The screen is held within the channel by a shoulder on an inward face of the rear flange which cooperates with a groove formed along the length of the screen. A front face of the front flange carries a longitudinal slot to which can be attached a facing strip carrying a chromed surface. The base strip is of a mat black finish so that the facing strip can be applied or removed to provide different appearances. A rear mounting portion defined by a pair of horizontal flanges having a horizontal channel therebetween is formed on the mounting strip and includes transverse slots set at spaced locations along the length of the strip to allow bending of the strip at specific points. A cover portion can be slipped into place and held in the mounting channel to extend over the slots when not used. A mounting bracket includes a web carried in the mounting channel and held thereby by a screw passing through the flanges into a rib on the underside of the lower flange. The mounting bracket includes planar fingers extending from the web each finger being separately bendable by a tool so that the bracket can be formed into shape by the end user.

13 Claims, 3 Drawing Sheets

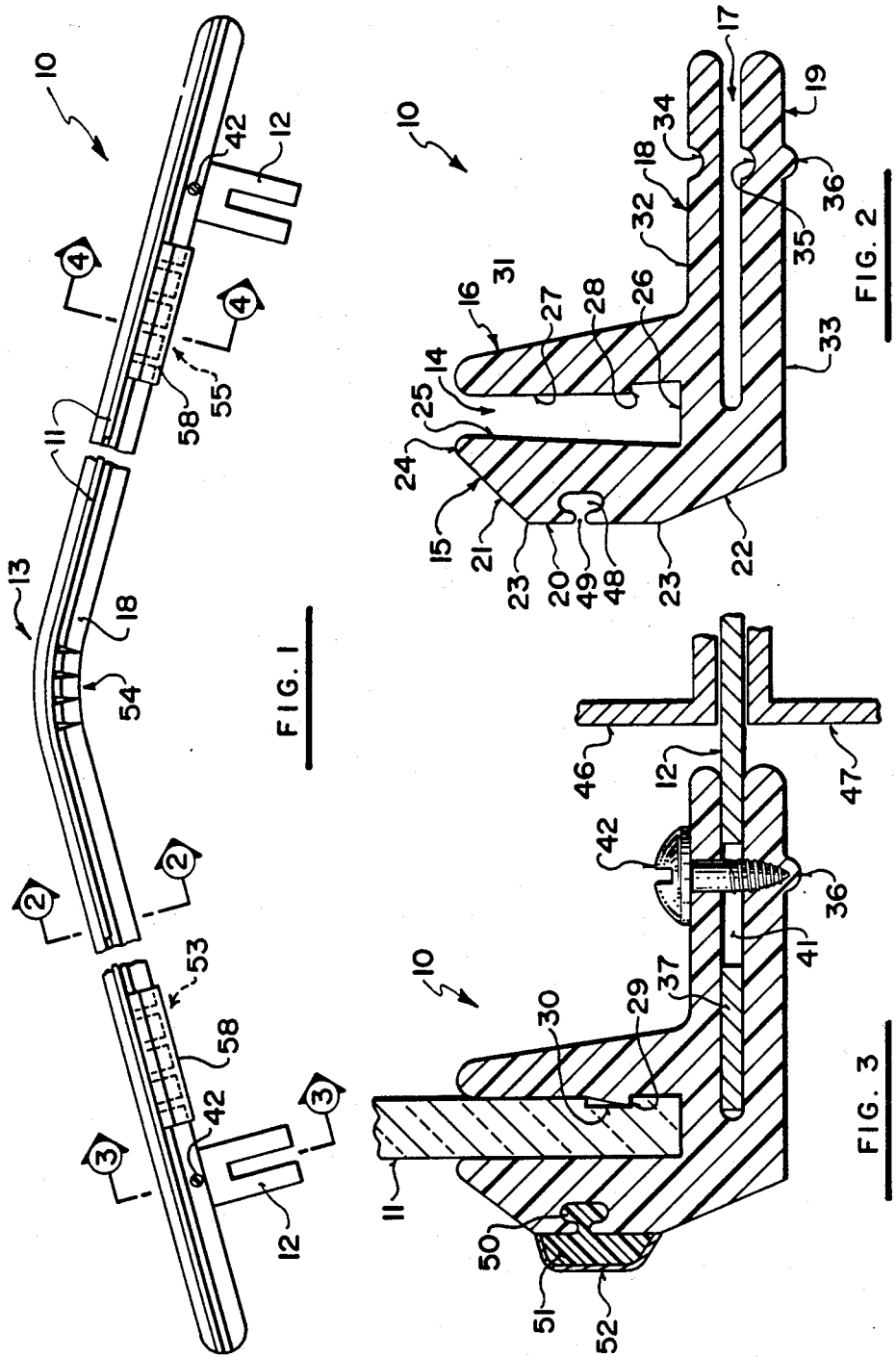

DEFLECTOR SCREEN FOR MOTOR VEHICLE

BACKGROUND OF THE INVENTION

This invention relates to a deflector screen for a motor vehicle of the type which includes a channel member which is generally extruded and cut to length and a screen which is mounted in the channel and extends upwardly therefrom. Suitable mounting mechanisms are provided for connecting the channel member to the hood of the motor vehicle at its connection to the front panel of the motor vehicle at the grill.

Various designs of this device have been manufactured and have been available for some years and the screen is generally formed from a transparent plastics material which is imperforate and this acts to deflect flying materials such as bugs, stones and the like upwardly away from the windshield.

In many cases the screen is glued into the channel and the channel attaches to a plate which is bent to the required shape to fit into the space between the hood and the front of the vehicle while holding the screen at the required location.

It will be appreciated that such screens are manufactured and sold for various different makes and models of vehicle and accordingly it is necessary to manufacture various lengths and mounting attachments to accommodate the different styles of hood. In some cases a central slight bend in the screen and the channel is desirable to follow the line of the hood. In other cases two separate bends are desirable adjacent the outer edges of the screen to follow the hood line. In addition there is a requirement for an extruded member which presents a mat appearance and also an extruded member which presents a shiny chromed appearance. It will be appreciated therefore that all of these different requirements constitute a serious inventory and manufacturing problem in that an attempt to satisfy all of the different requirements involves a large number of different models.

SUMMARY OF THE INVENTION

It is one object of the present invention, therefore, to provide an improved deflector screen device of this type which can readily be modified to fulfill one or more of the above requirements so that a purchaser can obtain a single model and can modify that model to accommodate his partiuclar requirements.

According to a first aspect of the invention, therefore, there is provided a deflector screen apparatus for attachment adjacent the front of the hood of a motor vehicle comprising an extruded strip member and defining a generally upstanding front surface, a channel portion rearwardly of the front surface defining a substantially vertical channel longitudinally of the strip member, a pane of screen material mounted in said channel and extending upwardly therefrom, an attachment portion extending rearwardly from said channel portion for receiving mounting means by which the strip member can be attached to the vehicle, means defining a slot longitudinally of said front surface and strip portion providing a front face forwardly of said front surface removably slidably mountable in said slot, said front face and said front surface being of materials providing a contrasting visual appearance.

According to a second aspect of the invention, therefore, there is provided a deflector screen apparatus for attachment adjacent the front of the hood of a motor vehicle comprising an extruded strip member and defining a generally upstanding front surface, a channel portion rearwardly of the front surface defining a substantially vertical channel longitudinally of the strip member, a pane of screen material mounted in said channel and extending upwardly therefrom, and an attachment portion extending rearwardly from said channel portion for receiving mounting means by which the strip member can be attached to the vehicle, wherein said pane of screen material has a groove formed therein in an outer surface thereof and adjacent the lowermost edge thereof and extending longitudinally of said strip member and wherein said channel portion defines a shoulder inside said channel and facing into said groove for cooperating with said groove to maintain said pane against vertical movement out of the channel.

According to a third aspect of the invention, therefore, there is provided a deflector screen apparatus for attachment adjacent the front of the hood of a motor vehicle comprising an extruded strip member and defining a generally upstanding front surface, a channel portion rearwardly of the front surface defining a substantially vertical channel longitudinally of the strip member, a pane of screen material mounted in said channel and extending upwardly therefrom, and an attachment portion extending rearwardly from said channel portion for receiving mounting means by which the strip member can be attached to the vehicle, said mounting means comprising a plate member having a web portion at one end and a pair of separate fingers extending outwardly therefrom toward an opposed end, said plate member being formed from a flat plastically deformable sheet material and wherein said fingers include a plurality of transverse lines thereacross for marking selected positions of bending of said fingers.

According to a fourth aspect of the present invention, therefore, there is provided a deflector screen apparatus for attachment adjacent the front of the hood of a motor vehicle comprising an extruded strip member and defining a generally upstanding front surface, a channel portion rearwardly of the front surface defining a substantially vertical channel longitudinally of the strip member, a pane of screen material mounted in said channel and extending upwardly therefrom, and an attachment portion extending rearwardly from said channel portion for receiving mounting means by which the strip member can be attached to the vehicle, said attachment portion comprising a pair of parallel flanges extending rearwardly from said channel portion and defining therebetween a substantially horizontal channel for receiving a plate member therein, said flanges having cut therein in a direction substantially at right angles thereto a plurality of closely adjacent slots whereby said strip member can be deformed by bending at said slots in a direction to reduce the width of the slots, and cover means defining U-shaped portion having one leg slidable within said horizontal channel and a second leg extending across an upper surface of an upper one of said flanges and an upstanding portion extending from an end of said upper leg adjacent said channel portion whereby said upper leg and said upward standing portion cover said slots.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a top plan view of a deflector shield according to the invention.

FIG. 2 is a cross sectional view along lines 2—2 of FIG. 1 with the screen removed to show the details of the extrusion.

FIG. 3 is a cross sectional view along the lines 3—3 of FIG. 1 with the front chromed strip removed.

In the drawings like characters of reference indicate corresponding parts in the different figures.

DETAILED DESCRIPTION

Figure 4:
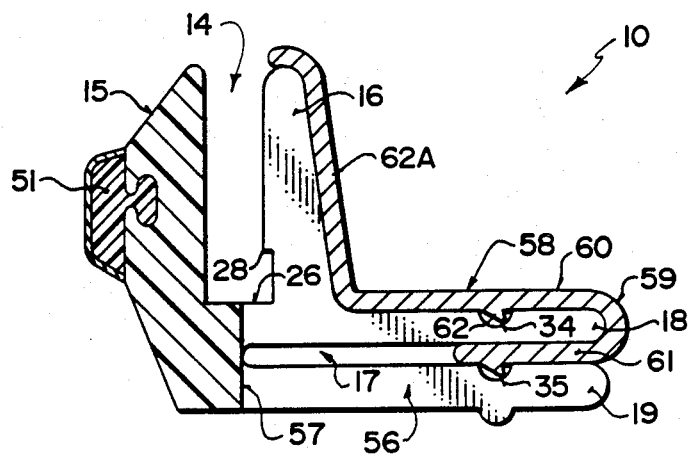
FIG. 4 is a cross sectional view along the lines 4—4 of FIG. 1.

Turning firstly to FIG. 1 there is shown in plan view a deflector screen including an elongate extruded mounting strip 10 and an upstanding shield 11. The strip 10 carries brackets 12 by which it can be attached to the front of a motor vehicle basically at the intersection between the hood and the grill of the motor vehicle. A center part indicated at 13 of the strip and screen is bent to define a forward projecting apex which enables the strip and screen to follow the curvature of the hood in some vehicles which are shaped in this manner.

Turning now to FIG. 2 there is shown the cross section of the basic extrusion of the strip 10. This extrusion defines a substantially vertical channel 14 formed between a pair of upstanding flanges 15 and 16 and a substantially horizontal channel 17 defined between a pair of horizontal and rearwardly extending flanges 18 and 19. The channel 14 is shaped to receive a screen 11 as shown in FIG. 3 and the channel 17 is shaped to receive the brackets 12 as also shown in FIG. 3.

The forwardmost flange 15 includes a front flat surface 20, an upper inclined surface 21 which extends rearwardly from the flat surface 20 and a lower inclined surface 22 which also extends or inclines rearwardly away from the front flat surface 20 thus defining angles 23. The upper surface 21 joins contiguously at 24 with a front face 25 of the channel 14. The front face inclines slightly from a narrowed mouth of the channel 14 to a wider base 26 of the channel. A rearward face 27 of the channel is formed on the flange 16 and also is inclined so the channel gradually tapers toward the mouth. A downwardly facing shoulder 28 is formed in the surface 27 to cooperate with a ledge 29 in the rear face of the sheet 11 as shown in FIG. 3, the ledge 29 being formed by a groove 30 cut in the rear face adjacent the lowermost edge of the sheet. The sheet is thus retained in the channel 14 by a friction fit caused by the taper in the channel and also by the engagement between the shoulder 28 and the ledge 29. No adhesive is used so that relative movement longitudinally of the screen can occur between the screen and the extruded strip.

A rear face 31 of the flange 16 extends downwardly and rearwardly to join with an upper face 32 of the flange 18. The flanges 18 and 19 are substantially parallel and define the elongate slot 17 which extends to a position beneath the slot 14 but spaced therefrom by the thickness of the flange 18. The lower surface 22 also joins contiguously with an undersurface 33 of the flange 19 with the surfaces 32 and 33 being substantially parallel and substantially horizontal. A groove 34 is formed in the upper surface 32 and aligned with a similar groove 35 formed in the upper surface of the flange 19. A rib 36 is formed on the undersurface 33 of the flange 19 and is again aligned with the grooves 34 and 35.

Figure 6:
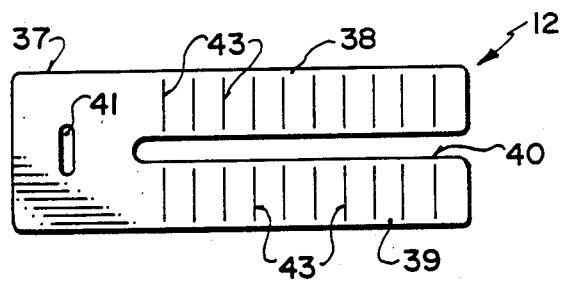
FIG. 6 is a top plan view on an enlarged scale of one of the attachment brackets of FIG. 1.

Turning now to FIGS. 3 and 6, the bracket 12 comprises a base web 37 and a pair of outwardly extending fingers 38 and 39 which are separated by a slot 40. The web 37 is of a dimension to be received within the channel 17 and has a substantially central opening 41 which is located in line with the grooves 34 and 35 when the web is fully inserted into the channel as shown in FIG. 3.

When fully inserted, a screw 42 can be placed with its point in the upper groove 34 and then rotated to drive screw through the flange 18 across the channel 17 and into the groove 35 with the grooves acting to align the screw and control its movement into the material of the flanges 18 and 19. The lenght of the screw 42 is chosen so that its apex when fully screwed into position with its head against the upper surface 32 is just received within the rib 36 to avoid sharp points being exposed on the underside of the extruded strip.

The bracket 12 as shown in FIG. 6 includes a plurality of transverse lines 43 which are scored across the upper surface of the bracket in spaced arrangement along the length of the fingers 38 and 39. These score marks 43 act as indicators for bending the fingers from the original planar shape in which the bracket is supplied to a required shape so that the strip when mounted on the bracket can be attached at the required location on the vehicle.

Figure 7:
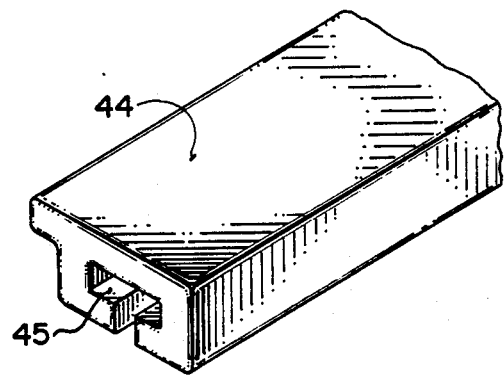
FIG. 7 is an isometric view of a portion of a tool for use in bending the bracket of FIG. 6.

A tool as indicated in FIG. 7 comprises an enlongate strip of extruded plastics material 44 defining along the length thereof an internal slot 45 which is shaped just to receive one of the fingers 38 or 39. The tool can thus be applied to one of the fingers by sliding from the open end thereof to a position along the length thereof as determined by the choice of one of the score marks 43. When the tool has reached the required location, the bracket can be grasped by a pair of pliers and the tool bent relative to the pliers to form a distortion in the chosen one of the fingers. Subsequently a second bend can be formed in the same finger by bending the tool relative to the bracket at a second required location. The second finger can then be separately bent to the same shape as the first.

It will be appreciated that the position of the strip 10 relative to the intersection between the hood and the front panel of the vehicle which are schematically indicated at 46 and 47 respectively in FIG. 3.

The formation of the bracket 12 with two separate fingers enables the bracket to be readily bent to shape by the user so a single bracket can be supplied in flat planar shape and then deformed if necessary to the required shape by the user to accommodate the particular model of vehicle with which the device is to be used.

Reverting to FIG. 2, it will be noted that the front face 20 of the flange 15 of the extruded strip includes a slot 48 which has a narrow mouth 49 and an inner part of larger cross section so as to receive a similarly shaped rib 50 defined on the rear face of a facing strip 51 shown in FIGS. 3 and 4.

The basic extruded strip 10 is preferably formed from a mat black plastics material so that with the front facing strip 51 omitted it gives the appearance of a mat strip carrying the sheet 11. The facing strip 51 is shaped to define a curved surface just covering the flat portion 20 of the front face of the flange 15. A front surface 52 of the facing strip 51 is formed of a chrome material so as to present a shiny polished silver appearance. It will be appreciated that the facing strip 51 can slide into position longitudinally of the strip 10 so that with the facing strip 51 in position the extruded mounting strip 10 has the appearance of a shiny silvered structure.

It is possible therefore for a single model of the product to be sold incorporating the strip 10 and the strip 51 in separated condition so that the user can if preferred mount the device with the appearance of a matte black mounting strip or can attach the chromed strip 51 to give the mounting the appearance of the chromed body. This therefore avoids the necesity of manufacturing and stocking in inventory two different models of the device one of which is of a matte black nature and the other of a chromed or extruded aluminum appearance.

Figure 5:
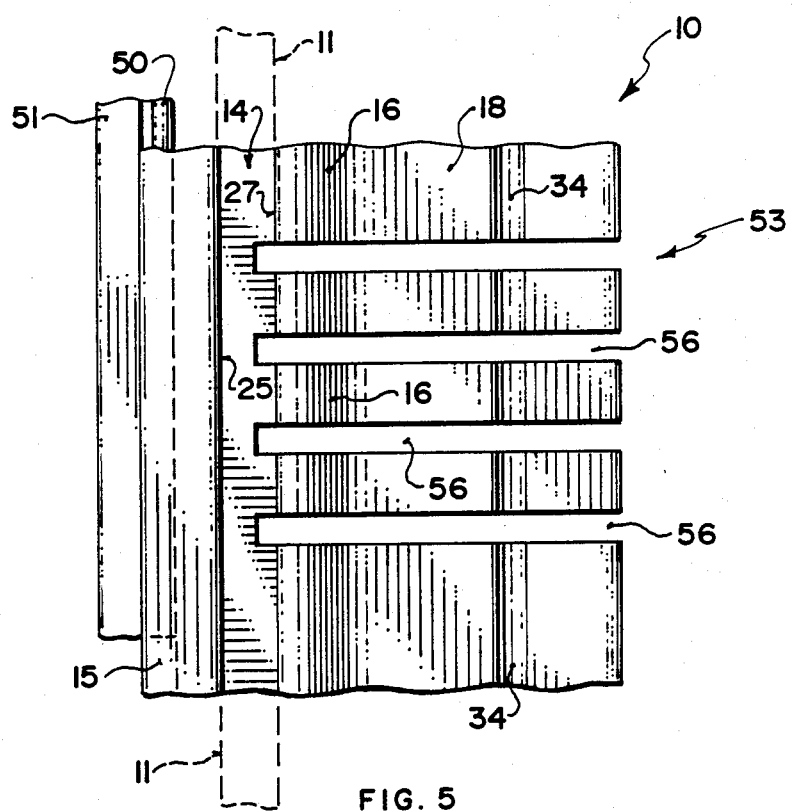
FIG. 5 is a top plan view of a portion of the extruded strip at the location shown in FIG. 4 with the cover strip removed.

Turning now to FIGS. 1, 4 and 5, the rear support flanges 18 and 19 are slotted as indicated at 53, 54 and 55 to allow bending of the extruded strip 10 at the required location. In an initial supplied condition of the strip 10 it can include the slots at three different locations along the length of the strip but with the strip in a straight condition.

The slots are shown in more detail in FIGS. 4 and 5 and in one example there are provided four such slots indicated at 56 with each slot lying at right angles to the length of the strip 10 and with the slots being equidistantly spaced longitudinally of the strip 10. Each of the slots extends from the rearmost apex of the flanges 18 and 19 through the whole depth of the flanges to the base of the channel 17 so the slot also cuts through the flange 16 and extends to a position half way along the base 26 of the channel 14. These slots thus allow the strip 10 to be bent in a rearward direction as indicated at 13 by the slots being closed at their outermost end so they taper from the innermost end toward the outermost end to amount dependent upon the severity of the bend. The bend curves at the innermost end indicated at 57 of the slot that is at the sheet 11 of screen material so as to reduce the amount of relative movement therebetween although such relative movement can be accommodated as previously explained by the mounting of the screen within the channel 14. In one example the slots may be ⅛ inch in thickness and spaced by a distance of the order of ¼ inch. Four such slots have been found to be sufficient to provide the degree of bend which is desirable to accommodate models of vehicle currently on the marketplace.

The availability of bend points at these slots 53, 54 and 55 enables a single model of the extruded strip 10 and screen 11 to be used for different models which require bends at different locations along the length of the strip.

Where it is desired to retain the strip in straight condition at any of the locations 53, 54 or 55 depending upon requirements, a cover strip 58 can be applied. The cover strip 58 includes a U-shaped portion 59 with legs 60 and 61 which wrap around the flange 18. Under surfaces of each of the legs 60 and 61 include a suitable notch 62 for engaging into a respective one of the grooves 34 and 35 to retain the cover portion in location so that preferably it is applied into position over the slots 56 by sliding longitudinally along the length of the strip 10. The leg 60 extends to a position adjacent the intersection between the flange 18 and the flange 16 and an upwardly inclined cover portion 62A is integrally attached thereto to lie along side the rearmost face of the flange 16 and then curve slightly over the upper apex thereof to a position closely adjacent or engaging the screen 11.

In this way the unused slots at the location 53, 54 or 55 are properly covered so as to present a pleasing appearance and so as to assist in retaining the strip in straight condition where no bend is required. The length of the cover 58 is merely sufficient just to cover the slots as indicated best in FIG. 1.

Figure 8:
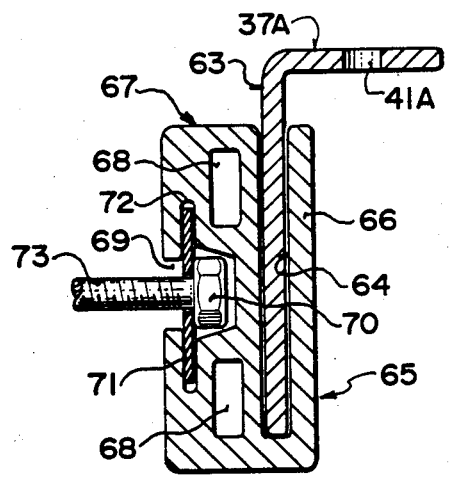
FIG. 8 is cross sectional view showing an alternative mounting bracket for mounting the deflector screen of FIG. 1.

Turning now to FIG. 8 there is shown an alternative bracket arrangement for mounting the strip 10 of FIG. 1 on a motor vehicle. In some cases it is desired to mount the strip 10 on the grille of the vehicle rather than between the hood and front panel. Thus a web portion 37A is arranged for engagement into the channel 17 and includes a central opening 41A which can be grasped by a screw not shown. The web 37A is attached to a plate 63 which is cranked downwardly at right angles relative to the web 37A for engagement into a channel 64 of an extruded bracket member 65. The channel is a vertical channel defined between a forwardmost leg 66 and a rear leg 67. The rear leg 67 is extruded to include openings 68 and also a recess 69 for receiving a bolt head 70 and washer 71. In this regard the recess includes an enlarged section 72 into which the washer can slide from one end of the part so as to engage the leg 67 and hold it in contact with the front of the grille of the vehicle with the bolt 73 passing through the grille to engage a suitable nut on a rear face of the grille. The extruded part 65 is cut to a length just to accommodate the width of the plate 63 which may be of the order of 4 inches and can be formed from a mat black plastics material so that the front face of the leg 66 is presented forwardly from the grille and can remain in position even with the bracket and attached deflector screen removed.

The above described deflector screen and associated parts thus enables a very limited number of models of the screen to accommodate various different vehicles and to provide various different appearances as required by the end user with minor modifications which can be carried out by the end user.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A deflector screen apparatus for attachment adjacent the front of the hood of a motor vehicle comprising an extruded strip member and defining a generally upstanding front surface, a channel portion rearwardly of the front surface defining a substantially vertical channel extending longitudinally along the strip member, a pane of screen material mounted in said channel and extending upwardly therefrom, an attachment portion extending rearwardly from said channel portion for receiving mounting means by which the strip member can be attached to the vehicle, said attachment portion comprising a pair of parallel flanges extending rearwardly from said channel portion and defining therebetween a substantially horizontal channel receiving a plate member therein, wherein an upper one of said flanges includes a groove in an upper surface thereof extending longitudinally therealong, and wherein a lower one of said flanges includes a projecting rib in a lower surface thereof and lying the same vertical plane as the groove whereby a screw can be screwed into said upper flange at said groove, through said horizontal channel and into said rib to maintain said plate member in said channel.

2. The invention according to claim 1 including means defining a slot longitudinally of said front surface and a strip portion providing a front face forwardly of said front surface removably slidably mountable in said slot, said front face and said front surface being of materials providing a contrasting visual appearance wherein the front face of the strip portion is narrower than the front surface.

3. The invention according to claim 2 wherein the front surface includes a substantially flat portion at said slot of a width substantially equal to that of the strip portion and wherein the front surface includes portions inclined rearwardly away from said flat portion.

4. The invention according to claim 2 wherein said strip member is extruded from a black plastics material and wherein said strip portion includes a silver coating thereon.

5. The invention according to claim 1 wherein said pane of screen material has a pair of parallel pane surface and four edge surfaces with a lowermost one of said edge surfaces being mounted in said channel, one of said pane surfaces having a groove formed therein adjacent to and parallel to the lowermost edge surface thereof and extending longitudinally along said strip member and wherein there is provided retaining means for retaining said plane in said channel comprising a surface of said channel portion connecting said one of said pane surfaces, said surface of said channel portion having only a single shoulder extending longitudinally along said channel and facing downwardly of the channel and projecting from said surface of said channel portion into said groove for cooperating with said groove to maintain said pane against vertical movement out of the channel.

6. The invention according to claim 5 including means for retaining said pane in said channel consisting solely of said groove and said shoulder.

7. The invention according to claim 5 including a plurality of slots cut in said attachment portion at a direction substantially at right angles to said channel and extending to said channel so as to allow said strip member to flex rearwardly by a reduction in width of said slots.

8. The invention according to claim 1 wherein said plate member comprises a web having an opening therein for positioning in said horizontal channel and two fingers extending from said web in a direction generally rearwardly of said horizontal channel, said fingers being separated and spaced from each other along their full length by a slot therebetween, said web and fingers being formed from an integral, flat, plastically deformable sheet material.

9. The invention according to claim 1 wherein said flanges have cut therein in a direction substantially at right angles thereto a plurality of closely adjacent slots whereby said strip member can be deformed by bending at said slots in a direction to reduce the width of the slots, and cover means defining U-shaped portion having one leg slidable within said horizontal channel and a second leg extending across an upper surface of an upper one of said flanges and an upstanding portion extending from an end of said upper leg adjacent said channel portion whereby said upper leg and said upstanding portion cover said slots.

10. A deflector screen apparatus for attachment adjacent the front of the hood of a motor vehicle comprising an extruded strip member and defining a generally upstanding front surface, a channel portion rearwardly of the front surface defining a substantially vertical channel extending longitudinally along the strip member, a pane of screen material having a pair of parallel pane surfaces and four edge surfaces with a lowermost one of said edge surfaces being mounted in said channel and extending upwardly therefrom, and an attachment portion extending rearwardly from said channel portion for receiving mounting means by which the strip member can be attached to the vehicle, said pane of screen material having a groove formed therein in one of said pane surfaces thereof parallel to and adjacent to the lowermost edge surface thereof and extending longitudinally along said strip member, said strip member including retaining means for retaining said pane in said channel consisting solely of frictional engagement between said pane surfaces and said surfaces of said channel portion and a single shoulder on only one of said surfaces of said channel portion contacting said one of said pane surfaces, said single shoulder extending longitudinally along said channel and facing only downwardly of the channel and projecting from said surface of said channel portion into said groove for cooperating with said groove to maintain said pane against movement out of the channel.

11. The invention according to claim 10 wherein means for retaining said pane in said channel consists solely of said groove and said single shoulder.

12. A deflector screen apparatus for attachment adjacent the front of the hood of a motor vehicle comprising an extruded strip member and defining a generally upstanding front surface, a channel portion rearwardly of the front surface defining a substantially vertical channel extending longitudinally along the strip member, a pane of screen material mounted in said channel and extending upwardly therefrom, and an attachment portion extending rearwardly from said channel portion for receiving mounting means by which the strip member can be attached to the vehicle, said attachment portion comprising a pair of parallel flanges extending rearwardly from said channel portion and defining therebetween a substantially horizontal channel for receiving a plate member therein, said flanges having cut therein in a direction substantially at right angles thereto a plurality of closely adjacent slots whereby said strip member can be deformed by bending at said slots in a direction to reduce the width of the slots, and cover means defining U-shaped portion having one leg slidable within said horizontal channel and a second leg extending across an upper surface of an upper one of said flanges and an upstanding portion extending from an end of said upper leg adjacent said channel portion whereby said upper leg and said upstanding portion cover said slots.

13. The invention according to claim 12 wherein an upper one of said flanges includes a groove in an upper surface thereof and wherein a lower one of said flanges includes a projecting rib in a lower surface thereof and lying the same vertical plane as the groove whereby a screw can be screwed into said upper flange at said groove, through said horizontal channel and into said rib to maintain said plate member in said channel.

* * * * *